No. 792,262. PATENTED JUNE 13, 1905.
J. B. HAY & A. J. DANIEL.
MACHINE FOR TREATING THE OFFAL OF ANIMAL CARCASSES.
APPLICATION FILED SEPT. 8, 1904.
2 SHEETS—SHEET 1.
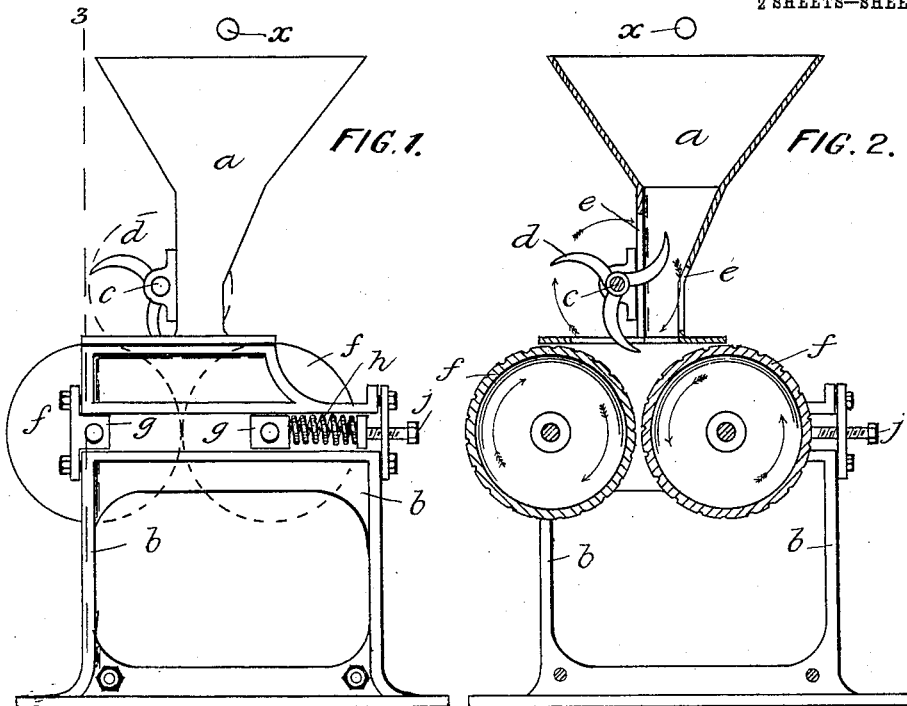
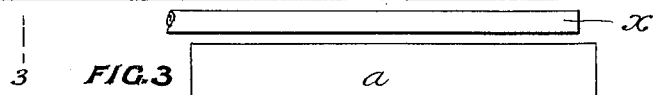

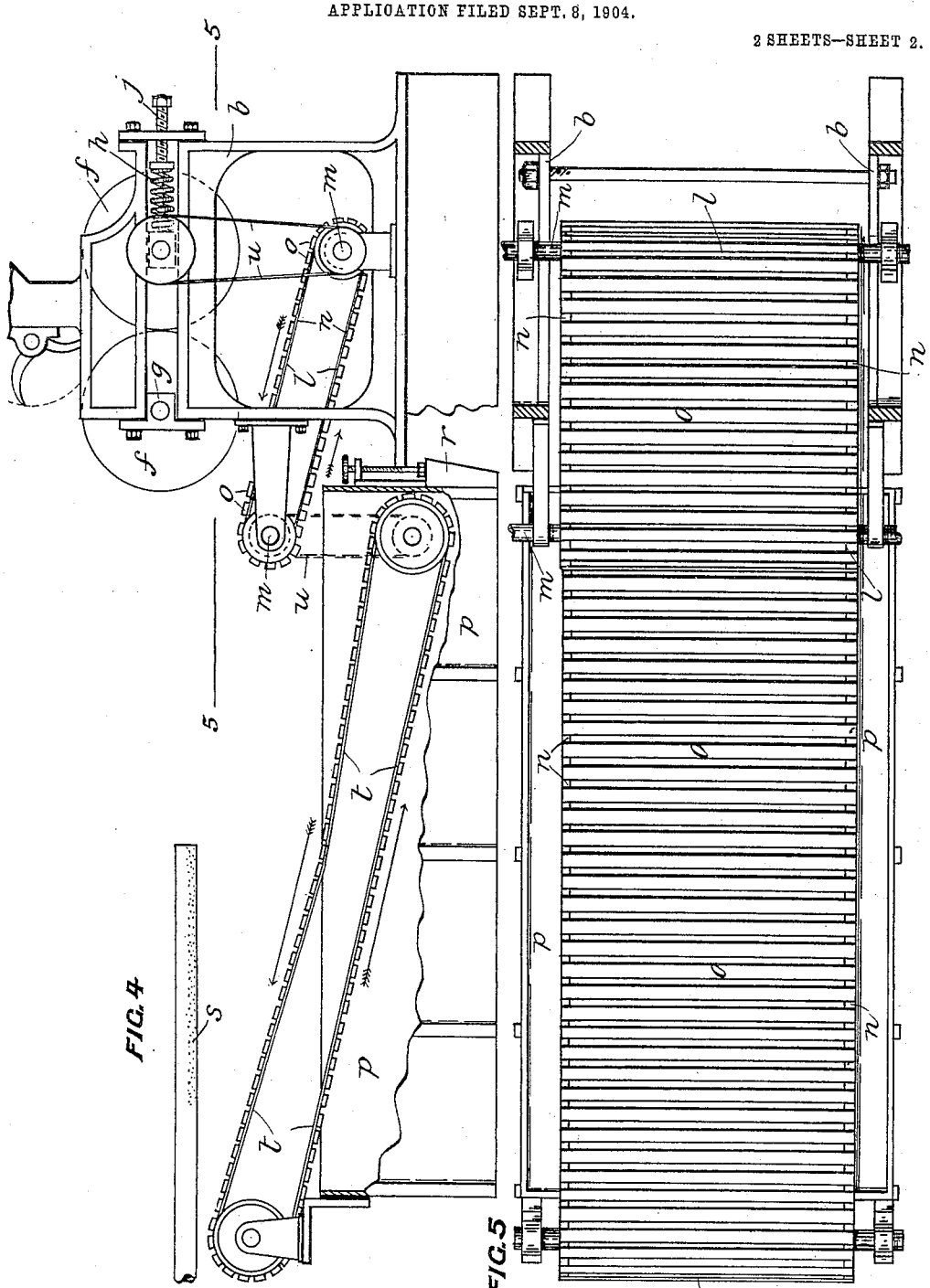

No. 792,262.

Patented June 13, 1905.

UNITED STATES PATENT OFFICE.

JOHN BUCHANAN HAY AND ALBERT JOHN DANIEL, OF WELLINGTON, NEW ZEALAND.

MACHINE FOR TREATING THE OFFAL OF ANIMAL CARCASSES.

SPECIFICATION forming part of Letters Patent No. 792,262, dated June 13, 1905.

Application filed September 8, 1904. Serial No. 223,765.

*To all whom it may concern:*

Be it known that we, JOHN BUCHANAN HAY and ALBERT JOHN DANIEL, subjects of the King of Great Britain, residing at Petone, Wellington, in the Colony of New Zealand, have invented a new and useful Machine for Treating the Offal of Animal Carcasses; and we do hereby declare the following to be a full, clear, and exact description of the same.

This invention relates to means for treating the offal of animal carcasses in order to separate therefrom the liquid constituents and for washing the remainder or solid matter in order that the tallow contained therein may be separated and collected and the residue saved for conversion into manure.

The means devised comprise a long hopper with a narrow opening extending longitudinally in its bottom. Mounted outside the hopper is a shaft to which a number of radial knives are attached. The side of the hopper is provided with slots therein, and the knife-shaft is so mounted in relation thereto that as the shaft revolves the knives will pass into the slots and travel across the space in the bottom of the hopper. Beneath the hopper are mounted a pair of squeezing-rollers adjustable in their distance apart and mounted on horizontally-parallel axes. These rollers are carried in bearings upon a suitable frame at each end and rotate in opposite directions. Beneath the rollers is mounted transversely an endless traveling table composed, preferably, of laths of metal linked together. This table is arranged at an incline, and its lower end is placed beneath the point of engagement of the squeezing-rollers. The top end of the table extends upward over a narrow water trough or tank, in which is mounted a similar endless traveling table, also arranged to travel in an upwardly-inclined direction and projecting out above one end of the tank.

In the accompanying drawings, Figure 1 is a side elevation of the hopper and squeezing-rollers mounted in their frame. Fig. 2 is a sectional elevation of the same. Fig. 3 is a longitudinal section taken on the line 3 3 of Fig. 1. Fig. 4 is a side elevation of the whole of the appliances with the hopper removed, portion of the washing-trough being shown in section to properly illustrate the traveling band therein. Fig. 5 is a plan of the washing-trough and traveling bands, the roller-frame being shown in sectional plan on the line 5 5 of Fig. 4.

$a$ is the hopper, which is mounted on top of a suitable frame composed of two check-plates $b$, bolted together by suitable tie-bolts. The bottom of the hopper is open, and it is narrowed in width toward the bottom. Mounted in bearings outside the hopper is the shaft $c$, which extends across the full length of the hopper and to which are secured a number of cutting-knives $d$. These knives are arranged in sets secured at intervals throughout the length of the shaft $c$. The knives are made, preferably, of the form shown in Figs. 1 and 2 with a curved cutting edge curving outward in the direction of rotation. The sides of the hopper $a$ are provided with slots $e$ opposite each set of knives $d$, so that as such knives are rotated they will pass through the slots and extend across the full width of the hopper, the knives being made of sufficient length to allow of them so extending. Beneath the bottom of the hopper are the squeezing-rollers $f$, which are supported on spindles carried in bearings $g$, mounted within the side frames $b$. These rollers are mounted on parallel axes and extend longitudinally beneath the hopper. The peripheral faces of the rollers are placed in engagement with each other and are kept in springy contact by mounting one roller in sliding bearings, against the outer faces of which helical springs $h$ bear, the tension on such springs and the consequent pressure of the rollers being regulated by set-screws $j$. The peripheral faces of the rollers are preferably fluted, as shown in Fig. 2. The rollers are caused to revolve in opposite directions, and the knife-shaft $c$ is caused to rotate by chain-and-sprocket gearing $k$, connected with one of the rollers.

Referring now to Figs. 4 and 5, $l$ is the endless traveling band, mounted beneath the rollers. The band is carried on sprocket-wheels mounted on shafts $m$, supported in bearings upon the frame b, and is composed of endless chains n, passing over the sprocket-wheels and carrying laths o, of wood or metal, secured at their ends to the respective chains and arranged in parallel lines extending longitudinally across beneath the rollers f with spaces between them. An endless traveling grating is thus formed. This band extends from beneath the point of contact between the rollers upward at a slight incline to beyond one side of the frame. p is the washing-trough, which is adapted to contain water and is provided with a sluice-valve r at one end, by means of which it may be emptied. Extending longitudinally above the trough is a perforated water-pipe s, by means of which water may be sprayed downward into the trough, so that when the valve r is opened a stream of water will flow through the trough. The upper end of the band l leads to a point above one end of the trough. t is an endless traveling band similar in construction to the band l, one end of which is mounted within the trough beneath the upper end of the band l, while the other end is carried on supports above the other end of the trough. The band thus extends at an incline from within the trough at one end to above and projecting beyond it at the other. Suitable driving-belts u for driving the traveling bands l and t from the rollers f are provided, so that the whole of the appliances may thus be caused to operate simultaneously. Other and separate means may, however, be employed.

In operation the whole of the offal is fed into the hopper a, down which it will gravitate. When it reaches the bottom, it will come into contact with the knives d, which have been started revolving, which knives will cut and slit it and will force it down through the bottom of the hopper. The stuff will then fall between the rollers f and will be carried through and the liquid matter squeezed out. Such liquid matter will then fall through the spaces in the traveling band l onto the floor beneath the rollers and will be drained away in any suitable manner. The solid matter will fall onto the band and will be carried upward by it and delivered over its top end onto the bottom end of the traveling band t in the trough p. It is then carried along on this band through the trough and during the first part of its course will meet a current of water flowing through the trough in the opposite direction. This water will wash the tallow and other fatty matters from the stuff, which tallow may then be collected in settling-tanks of ordinary type. The offal thus freed from its liquid and fatty matters will be carried up out of the trough and delivered over the top end of the band t into any suitable receptacle and removed for any desired further treatment—such, for instance, as for conversion into manure. If desired, a stream of water may be led into the hopper through the perforated water-pipe x to assist in the separation of the liquid from the solid constituents of the offal.

In some instances the washing-trough and its adjuncts may be dispensed with and the solid matter of the offal taken away for treatment directly after passing between the squeezing-rollers.

What we do claim as our invention, and desire to secure by Letters Patent, is—

1. In means for cleaning the offal of animal carcasses, a hopper formed with a narrow longitudinal opening in its bottom, a rotating shaft mounted outside the hopper, knife-blades radiating from the shaft and adapted to pass across the space inclosed between the sides of the hopper near its bottom, and a pair of squeezing-rollers mounted on parallel axes longitudinally beneath the hopper adapted to rotate in opposite directions, substantially as specified.

2. In means for cleaning the offal of animal carcasses, a hopper formed with a narrow longitudinal opening in its bottom a rotating shaft outside the hopper, knife-blades radiating from the shaft and adapted to pass across the space inclosed between the sides of the hopper near its bottom, a pair of squeezing-rollers mounted on parallel axes longitudinally beneath the hopper and rotating in opposite directions, in combination with a trough, a traveling grating extending longitudinally through such trough and a perforated water-pipe extending above the grating, substantially as specified.

3. In means for cleaning the offal of animal carcasses a hopper mounted on a frame and provided with a longitudinal opening in the bottom, rotating knives passing across the space inclosed near the bottom of the hopper, squeezing-rollers mounted in the frame below the hopper, an endless traveling grating extending from beneath the rollers to one side of the frame, a trough above one end of which the grating extends, an endless traveling grating extending along such trough and above the other end thereof and means whereby a stream of water may be delivered onto the grating, substantially as specified.

In testimony whereof we have signed this specification in the presence of two subscribing witnesses.

JOHN BUCHANAN HAY.
ALBERT JOHN DANIEL.

Witnesses:
W. ALEXANDER,
G. T. WIX.